US012630101B2

(12) United States Patent
Kosaka et al.

(10) Patent No.: US 12,630,101 B2
(45) Date of Patent: May 19, 2026

(54) INFORMATION PROCESSING APPARATUS, INFORMATION PROCESSING METHOD, AND IN-VEHICLE APPARATUS

(71) Applicant: TOYOTA JIDOSHA KABUSHIKI KAISHA, Toyota (JP)

(72) Inventors: Kei Kosaka, Meguro-ku (JP); Hironori Aokage, Nagoya (JP); Tatsuya Maemura, Nisshin (JP); Ryosuke Matsuoka, Nishinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 142 days.

(21) Appl. No.: 18/597,288

(22) Filed: Mar. 6, 2024

(65) Prior Publication Data

US 2024/0300424 A1 Sep. 12, 2024

(30) Foreign Application Priority Data

Mar. 10, 2023 (JP) ................................. 2023-037359

(51) Int. Cl.
 *B60R 16/023* (2006.01)
 *B60R 16/033* (2006.01)
 *H04N 7/18* (2006.01)
(52) U.S. Cl.
 CPC ........ *B60R 16/0231* (2013.01); *B60R 16/033* (2013.01); *H04N 7/183* (2013.01)
(58) Field of Classification Search
 CPC .. B60R 16/0231; B60R 16/033; H04N 7/183; G07C 5/008; G07C 5/0866; H04W 4/12; H04W 4/44; H04W 4/48
 See application file for complete search history.

(56) References Cited

U.S. PATENT DOCUMENTS 9,169,684 B2 * 10/2015 Fan ......................... E05F 15/77

FOREIGN PATENT DOCUMENTS

| | | |
|---|---|---|
| JP | 2003-317177 A | 11/2003 |
| JP | 2005-287158 A | 10/2005 |
| JP | 2012-228789 A | 11/2012 |
| JP | 2017-127104 A | 7/2017 |
| JP | 2018-016138 A | 2/2018 |
| JP | 2021-166438 A | 10/2021 |
| JP | 2023-030279 A | 3/2023 |
| WO | WO 2012/147827 A1 | 11/2012 |

* cited by examiner

*Primary Examiner* — Long T Tran
*Assistant Examiner* — Charles J Brauch
(74) *Attorney, Agent, or Firm* — Finnegan, Henderson, Farabow, Garrett and Dunner, LLP

(57) ABSTRACT

An information processing apparatus includes a controller configured to execute a startup process of one or multiple in-vehicle devices used to send captured data when a driving system of a first vehicle is not up, a view request is received from a user, and a request number is smaller than a first threshold, and not execute the startup process of the one or multiple in-vehicle devices when the driving system of the first vehicle is not up, the view request is received from the user, and the request number is larger than or equal to the first threshold. The view request is a request to send the captured data captured by an onboard camera of the first vehicle to a predetermined apparatus. The request number is a number that the view request is received from the user in a predetermined period.

17 Claims, 8 Drawing Sheets

FIG. 3

INFORMATION PROCESSING APPARATUS — 100A

CONTROLLER — 110A

RECEIVING UNIT — 111

NUMBER-OF-TIMES DETERMINING UNIT — 112

STARTUP UNIT — 113

NOTIFICATION UNIT — 114

THRESHOLD CHOOSING UNIT — 115

STORAGE UNIT — 120

COMMUNICATION UNIT — 130

START

ACQUIRE ACCUMULATED NUMBER OF TIMES OF CONVERTER STARTUP — S51

CHOOSE FIRST THRESHOLD BASED ON ACCUMULATED NUMBER OF TIMES OF CONVERTER STARTUP — S52

END

INFORMATION PROCESSING APPARATUS — 100B

CONTROLLER — 110B

RECEIVING UNIT — 111

NUMBER-OF-TIMES DETERMINING UNIT — 112

STARTUP UNIT — 113

NOTIFICATION UNIT — 114

THRESHOLD DETERMINING UNIT — 115

CONTRACT DETERMINING UNIT — 116

STORAGE UNIT — 120

COMMUNICATION UNIT — 130

START

S61 — IS VEHICLE TEMPORARILY RENTED ?

NO

YES

S62 — SET FIRST THRESHOLD TO VALUE SMALLER THAN VALUE WHEN VEHICLE IS OWNED

END

INFORMATION PROCESSING APPARATUS, INFORMATION PROCESSING METHOD, AND IN-VEHICLE APPARATUS

CROSS-REFERENCE TO RELATED APPLICATION

This application claims priority to Japanese Patent Application No. 2023-037359 filed on Mar. 10, 2023, incorporated herein by reference in its entirety.

BACKGROUND

1. Technical Field

The disclosure relates to monitoring of a vehicle.

2. Description of Related Art

There is known a technology for, when a vehicle is parked, operating a vehicle monitoring function from a predetermined device carried by a user to cause the vehicle monitoring function to provide a notification about the status of the vehicle to the device. In this regard, for example, Japanese Unexamined Patent Application Publication No. 2018-016138 (JP 2018-016138 A) describes a unit that, when a vehicle is not running, allows a user to select any one of a plurality of monitoring functions of the vehicle from an information terminal and provides a monitored result to the information terminal.

SUMMARY

The disclosure extends the lifespan of an in-vehicle device.

A first aspect of the disclosure is an information processing apparatus including a controller. The controller is configured to execute a startup process of one or multiple in-vehicle devices used to send captured data when a driving system of a first vehicle is not up, a view request is received from a user, and a request number is smaller than a first threshold, and not execute the startup process of the one or multiple in-vehicle devices when the driving system of the first vehicle is not up, the view request is received from the user, and the request number is larger than or equal to the first threshold. The view request is a request to send the captured data captured by an onboard camera of the first vehicle to a predetermined apparatus, and the request number is a number that the view request is received from the user in a predetermined period.

In the first aspect, the controller may be configured to count a number about the view request received from the user in the predetermined period as the request number, and provide the user with a notification indicating that acquisition of the captured data is not possible when the request number in the predetermined period is larger than or equal to the first threshold.

In the first aspect, the controller may be configured to choose the first threshold based on an accumulated number about converter startup. The accumulated number may be a total number about a DC-DC converter being started up. The DC-DC converter may be configured to convert voltage for supplying electric power of a drive battery of the first vehicle to the in-vehicle device.

In the first aspect, the controller may be configured to acquire, from the first vehicle, information on the accumulated number at a predetermined time.

In the first aspect, the controller may be configured to set the first threshold to a smaller value as the accumulated number increases.

In the first aspect, the controller may be configured to set the first threshold to a smaller value when the first vehicle is a vehicle temporarily rented to the user as compared to when the first vehicle is owned by the user.

In the first aspect, the controller may be configured to propose, to the user, a contract to increase a captured data acquisition time limit or data communication traffic limit per each view request when the controller provides the user with a notification indication that acquisition of the captured data is not possible.

In the first aspect, the in-vehicle device may be the onboard camera or an in-vehicle terminal.

In the first aspect, the information processing apparatus may include an information terminal, and a transmitter configured to perform wireless connection.

A second aspect of the disclosure is an information processing method. The information processing method includes executing a startup process of one or multiple in-vehicle devices used to send captured data when a driving system of a first vehicle is not up, a view request is received from a user, and a request number is smaller than a first threshold, and not executing the startup process of the one or multiple in-vehicle devices when the driving system of the first vehicle is not up, the view request is received from the user, and the request number is larger than or equal to the first threshold. The view request is a request to send the captured data captured by an onboard camera of the first vehicle to a predetermined apparatus, and the request number is a number that the view request is received from the user in a predetermined period.

In the second aspect, the information processing method may include counting a number about the view request received from the user in the predetermined period as the request number, and providing the user with a notification indicating that acquisition of the captured data is not possible when the request number in the predetermined period is larger than or equal to the first threshold.

In the second aspect, the information processing method may include choosing the first threshold based on an accumulated number about converter startup. The accumulated number may be a total of the number about a DC-DC converter being started up. The DC-DC converter may be configured to convert voltage for supplying electric power of a drive battery of the first vehicle to the in-vehicle device.

In the second aspect, the information processing method may include acquiring, from the first vehicle, information on the accumulated number at a predetermined point in time.

In the second aspect, the information processing method may include setting the first threshold to a smaller value as the accumulated number of times increases.

In the second aspect, the information processing method may include setting the first threshold to a smaller value when the first vehicle is a vehicle temporarily rented to the user as compared to when the first vehicle is owned by the user.

In the second aspect, the information processing method may include proposing, to the user, a contract to increase a captured data acquisition time limit or data communication traffic limit per each view request when a notification indicating that acquisition of the captured data is not possible is provided to the user.

In the second aspect, the in-vehicle device may be the onboard camera or an in-vehicle terminal.

A third aspect of the disclosure is an in-vehicle apparatus including a controller. The controller is configured to receive, from a predetermined information processing apparatus, an instruction for starting up one or multiple target devices at least including an onboard camera, start up the one or multiple target devices based on the instruction, and send captured data captured by the onboard camera to the information processing apparatus.

In the third aspect, the controller may be configured to acquire a startup number of a DC-DC converter in a predetermined period, the DC-DC converter being configured to transform electric power supplied to the target device, and send the startup number to the information processing apparatus.

Other aspects include a method executed by the above-described apparatus, a program for causing a computer to execute the method, and a computer-readable storage medium storing the program in a non-transitory manner.

According to the aspects of the disclosure, it is possible to extend the lifespan of an in-vehicle device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart of a process that is executed by a controller of the information processing apparatus according to the first embodiment;

DETAILED DESCRIPTION OF EMBODIMENTS

Figure 1:
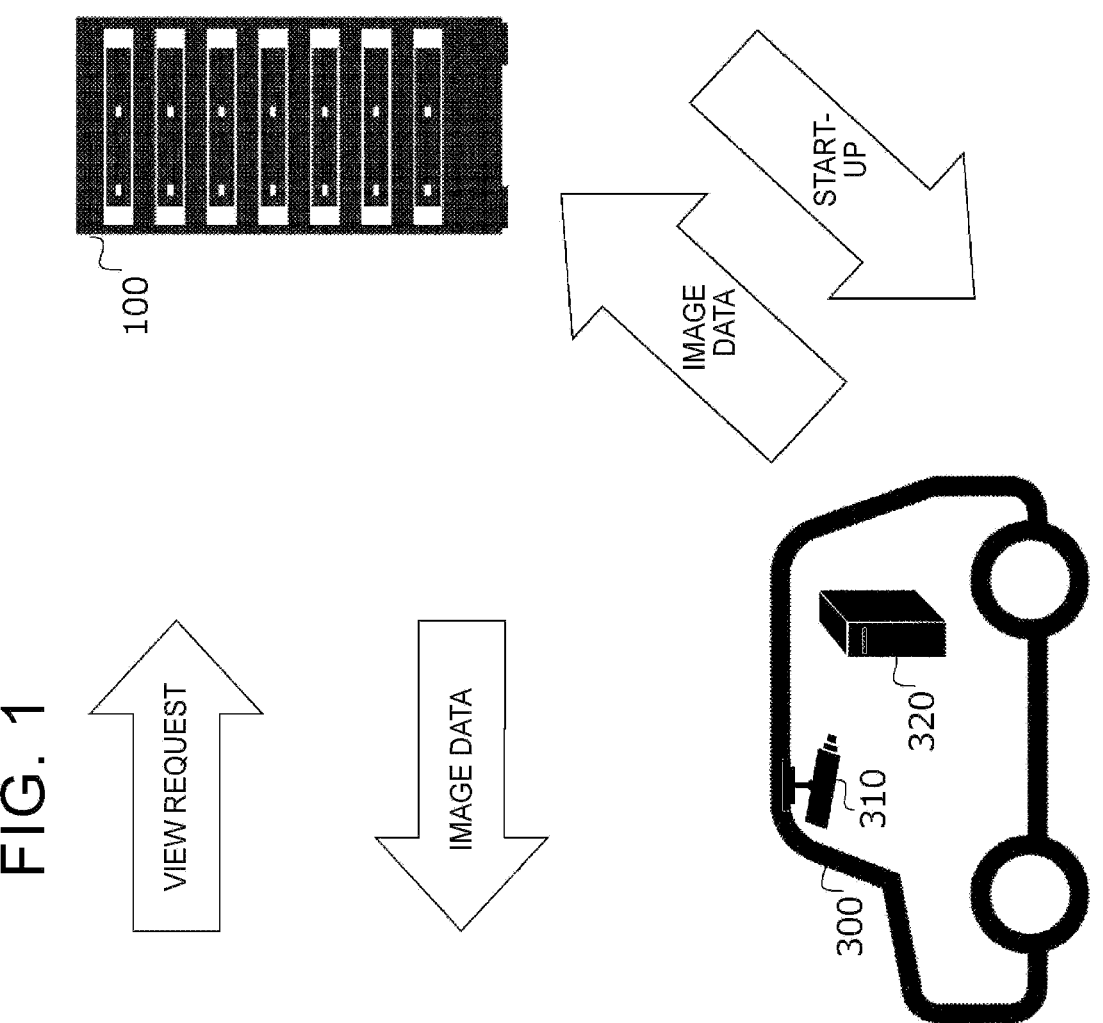
FIG. 1 is a conceptual view of a system including an information processing apparatus according to a first embodiment.
Figure 1:
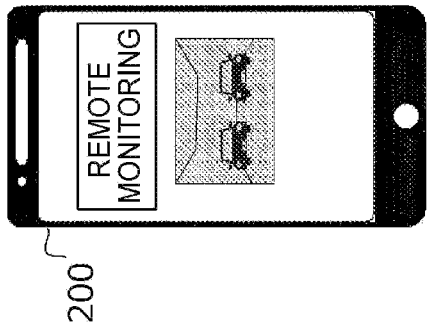

There is known a monitoring system that sends data for monitoring a parked vehicle to an information terminal in response to a request from a user. Thus, for example, it is possible to provide a video captured by an onboard camera in real time in response to a request from the user.

In a hybrid electric vehicle or a battery electric vehicle, electric power for operating an in-vehicle device used to monitor the vehicle may be supplied from a drive battery of the vehicle.

There is known, for example, a configuration to convert a high-voltage current from a drive battery of a vehicle with a DC-DC converter and supply the converted current to an in-vehicle device.

In the above configuration, when there is a request from a user, the DC-DC converter is started up to activate the in-vehicle device used to monitor the vehicle. However, in the existing monitoring system, the lifespan of the DC-DC converter is not appropriately taken into consideration.

Elements of the DC-DC converter progressively degrade due to electrical stress and thermal stress. In other words, as the number of times the DC-DC converter starts up increases, the lifespan of the DC-DC converter shortens.

When a user makes a request to monitor the vehicle of which the system is in a stopped state, the DC-DC converter of the vehicle starts up. Therefore, if the request is allowed without a limit, the degradation of the DC-DC converter may be accelerated. This not only applies to the DC-DC converter but also applies to the other in-vehicle devices relevant to monitoring of the vehicle.

The information processing apparatus according to the aspect of the disclosure solves such an inconvenience.

The information processing apparatus according to the aspect of the disclosure includes a controller. The controller is configured to: in a state where a driving system of a first vehicle is not up, receive a view request to send captured data, captured by an onboard camera of the first vehicle, to a predetermined apparatus from a user and, when the number of requests, which is the number of times the view request is received from the user in a past predetermined period, is smaller than a first threshold, execute a startup process of one or multiple in-vehicle devices used to send the captured data; and, in a state where the driving system of the first vehicle is not up, when the view request to send captured data, captured by the onboard camera of the first vehicle, to the predetermined apparatus is received from the user and the number of requests is larger than or equal to the first threshold, not execute the startup process of the one or multiple in-vehicle devices.

The view request is a request to provide instructions to send captured data captured by the onboard camera of the first vehicle to the predetermined apparatus. The view request may be sent from an information terminal associated with the user to the information processing apparatus or may be directly input to the information processing apparatus.

The number of requests is the number of times the information processing apparatus receives the view request from the user.

The startup process of the in-vehicle device is that the information processing apparatus sends instructions to one or more in-vehicle devices (such as the onboard camera and an in-vehicle terminal) used to acquire captured data to cause the one or more in-vehicle devices to start up.

The startup process of the in-vehicle device may include a process in which the information processing apparatus starts up the DC-DC converter configured to supply transformed electric power to the in-vehicle device. Alternatively, the startup process of the in-vehicle device may include that the information processing apparatus instructs an in-vehicle apparatus (for example, an electronic control unit (ECU) or the like) that has a role in controlling the in-vehicle device, to start up the in-vehicle device.

The controller of the information processing apparatus is configured to, when the number of requests, which is the number of times the view request is received from the user in the past predetermined period is smaller than the first threshold, execute the startup process of the one or multiple in-vehicle devices used to send the captured data. The controller is configured to, when the number of requests is larger than or equal to the first threshold, not execute the startup process of the one or multiple in-vehicle devices.

In other words, the controller is configured to switch whether to execute the startup process of the one or multiple in-vehicle devices used to send the captured data, in accordance with the number of requests, which is the number of times the view request is received from the user in the past predetermined period. Specifically, the controller is configured to, when the number of view requests that have been received in the last predetermined period is larger than or equal to a predetermined number of times, restrict the startup process of the in-vehicle device.

The information processing apparatus may be a server apparatus wirelessly connected to the first vehicle or may be an apparatus mounted on the first vehicle. The information processing apparatus may be an information terminal associated with the user.

The controller of the information processing apparatus may count the number of times the view request is received from the user in the past predetermined period as the number of requests and, when the number of requests in the past predetermined period is larger than or equal to the first threshold, may provide the user with a notification that acquisition of the captured data is not possible. The controller may be configured to provide the notification by screen display or voice.

The controller of the information processing apparatus may be configured to choose the first threshold based on an accumulated number of times of converter startup, which is a total of the number of times a DC-DC converter is started up, the DC-DC converter being configured to convert voltage for supplying electric power of a drive battery of the first vehicle to the in-vehicle device. In other words, the controller may variably choose the first threshold in accordance with the accumulated number of times of converter startup.

The controller of the information processing apparatus may be configured to acquire, from the first vehicle, information on the accumulated number of times of converter startup at a predetermined point in time. The controller may be configured to acquire the information on the accumulated number of times of converter startup by communicating with the first vehicle via a communication unit.

The controller of the information processing apparatus may be configured to set the first threshold to a smaller value as the accumulated number of times of converter startup increases. Because it is possible to estimate that the degradation of the DC-DC converter advances as the accumulated number of times of converter startup increases, the threshold is preferably reduced in order to protect the DC-DC converter from degradation.

The controller of the information processing apparatus may be configured to, when the first vehicle is a vehicle temporarily rented to the user, set the first threshold to a smaller value as compared to when the first vehicle is owned by the user. The controller may be configured to variably choose the first threshold in accordance with information indicating a contract of the user on the first vehicle.

The controller of the information processing apparatus may be configured to, when the controller provides the user with a notification indicating that acquisition of the captured data is not possible, propose, to the user, a contract to increase a captured data acquisition time limit or data communication traffic limit per each view request. When there is the captured data acquisition time limit per each view request or data communication traffic limit per each view request, acquisition of the captured data can be interrupted due to the limit. In this case, the user may repeatedly issue the view request and, as a result, the degradation of the device may advance. Thus, to avoid this situation, a contract to case these limits may be proposed to the user.

The in-vehicle device may be any one of the onboard camera and an in-vehicle terminal. Here, the in-vehicle terminal may be a terminal that provides a service of a car navigation system, or may be a terminal that replays a moving image content or a voice content, or may be a terminal that provides an integrated platform in providing an in-vehicle service to the user.

The information processing apparatus may further include a communication unit configured to perform wireless connection with the information terminal. The information processing apparatus may directly or indirectly perform wireless communication with the information terminal in conformity with a communication standard using Wi-Fi (registered trademark) or a communication standard using Low Power Wide Area (LPWA).

An in-vehicle apparatus according to an aspect of the disclosure includes a controller. The controller is configured to: receive, from a predetermined information processing apparatus, an instruction for starting up one or multiple target devices at least including an onboard camera; start up the one or multiple target devices based on the instruction; and send captured data captured by the onboard camera to the information processing apparatus. The in-vehicle apparatus may be the above-described apparatus for starting up the in-vehicle device. Examples of the in-vehicle apparatus include an electronic control unit (ECU) of the first vehicle.

The controller of the in-vehicle apparatus may be configured to acquire the number of times of startup of a DC-DC converter in a predetermined period, the DC-DC converter being configured to transform electric power supplied to the target device, and send the number of times of startup to the information processing apparatus. The controller of the in-vehicle apparatus may be configured to read the number of times of startup of the DC-DC converter from the DC-DC converter based on a CAN protocol and send the number of times of startup to the information processing apparatus via an external wide area network.

With the above configuration, it is possible to extend the lifespan of the in-vehicle device such as the DC-DC converter.

First Embodiment

The outline of an information processing apparatus according to a first embodiment will be described with reference to FIG. 1. FIG. 1 is a conceptual view of a system including an information processing apparatus 100 according to the first embodiment.

The information processing apparatus 100 acquires captured data (video data) captured by an onboard camera 310 mounted on a vehicle 300 and sends the captured data to an information terminal 200 held by a user. The information processing apparatus 100 may be, for example, an application server that communicates with the vehicle 300. Alternatively, the information processing apparatus 100 may be an in-vehicle apparatus.

Specifically, the information terminal 200 associated with the user sends, to the information processing apparatus 100, a view request that is a signal for acquiring captured data captured by the onboard camera 310, in order to monitor the vehicle 300. When the information processing apparatus 100 receives the view request, the information processing apparatus 100 communicates with a communication unit 330 (specifically, which may be a data communication module (DCM)) mounted on the vehicle 300 and starts up an in-vehicle device such as the onboard camera 310, used to monitor the vehicle 300.

The communication unit 330 of the vehicle 300 sends captured data captured by the onboard camera 310 to the information processing apparatus 100. Then, the information processing apparatus 100 sends the captured data to the information terminal 200. The information terminal 200 decodes the captured data and outputs the obtained video via a display unit 240. Thus, it is possible to allow the user to view the video acquired by the onboard camera 310.

As described above, a DC-DC converter used to start up the in-vehicle device such as the onboard camera 310 has a lifespan. Therefore, it is not desirable to unlimitedly execute a startup process of the in-vehicle device such as the onboard camera 310 (a startup process of a device used for a vehicle monitoring service in the vehicle 300) involving startup of the DC-DC converter. For this reason, when the number of times a video captured by the onboard camera 310 is viewed in a past predetermined period is larger than or equal to a predetermined number of times (predetermined threshold), the information processing apparatus 100 restricts startup of the device such as the onboard camera 310, used for the vehicle monitoring service in the vehicle 300.

For example, the information processing apparatus 100 receives the view request from the information terminal 200 and counts the number of times the view request is received in a past predetermined period as the number of requests. When the number of requests in the predetermined period is smaller than the predetermined threshold, the information processing apparatus 100 executes the startup process of the device such as the onboard camera 310, used for the vehicle monitoring service in the vehicle 300.

In contrast, when the number of requests in the past predetermined period is larger than or equal to the predetermined threshold, the information processing apparatus 100 restricts startup of the device such as the onboard camera 310, used for the vehicle monitoring service in the vehicle 300.

In this way, when the information processing apparatus 100 limits the number of times the captured data captured by the onboard camera 310 is acquired, the number of times of startup of the in-vehicle device such as the onboard camera 310 is reduced, with the result that it is possible to extend the lifespan of the in-vehicle device.

Figure 2:
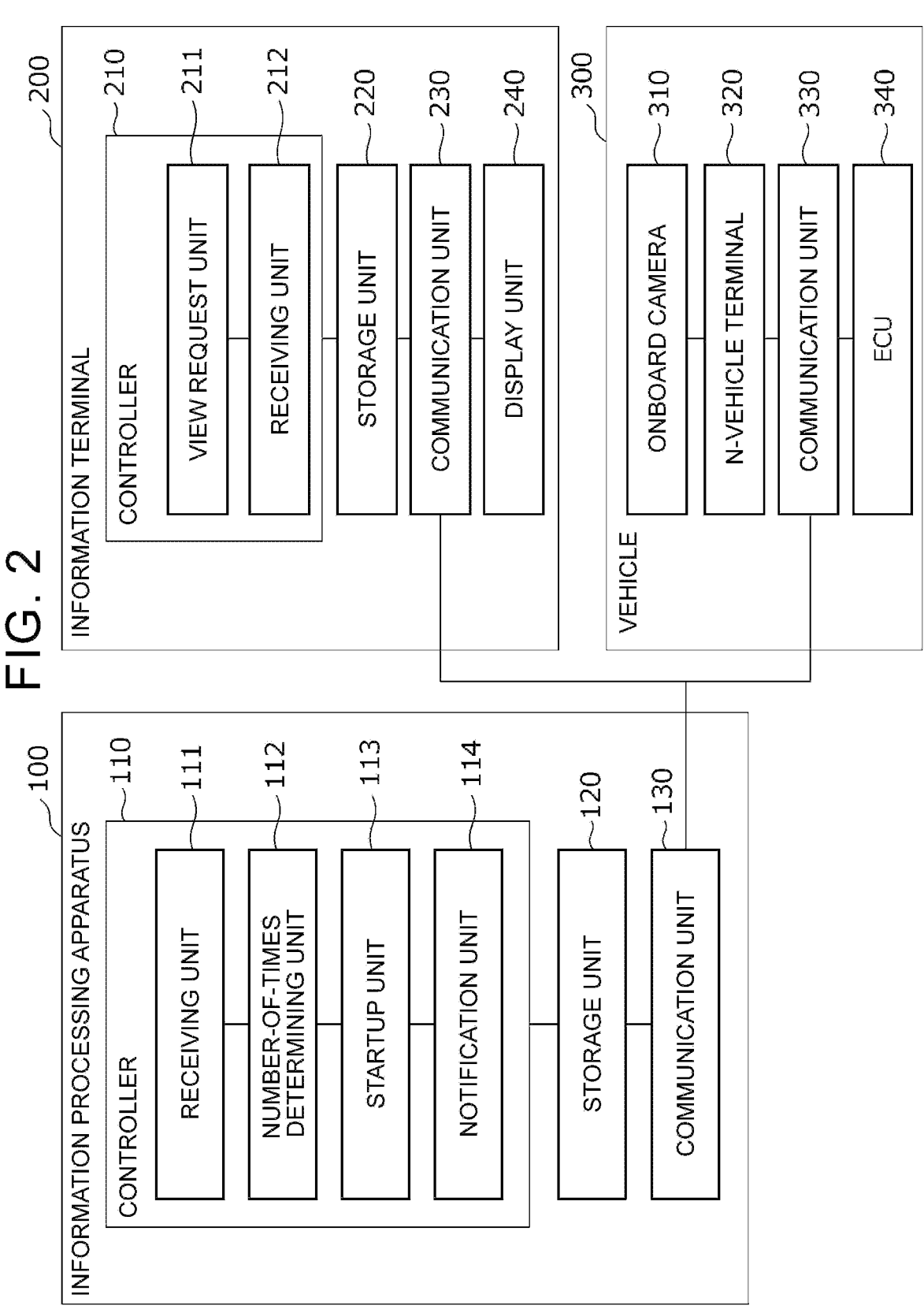
FIG. 2 is a diagram that illustrates component elements of a system according to the first embodiment.

Next, component elements of the information processing apparatus 100 will be described with reference to FIG. 2. FIG. 2 is a diagram that illustrates the component elements of the system according to the first embodiment.

When the information processing apparatus 100 receives the view request from the information terminal 200, the information processing apparatus 100 starts up the in-vehicle device such as the onboard camera 310 mounted on the vehicle 300 and acquires captured data. Here, the captured data may be video data captured in real time and sent by streaming or may be video data recorded in advance. The captured data may include a voice. When the information processing apparatus 100 executes the above process, the information processing apparatus 100 switches whether to start up the in-vehicle device or the like, in accordance with the number of requests in a past predetermined period.

The information processing apparatus 100 includes a controller 110, a storage unit 120, and a communication unit 130. The information processing apparatus 100 communicates via the communication unit 130 with the information terminal 200 and the vehicle 300. The vehicle 300 includes the onboard camera 310 and an in-vehicle terminal 320. The information terminal 200 includes a controller 210, a storage unit 220, a communication unit 230, and the display unit 240.

The vehicle 300 includes the onboard camera 310, the in-vehicle terminal 320, the communication unit 330, and an ECU 340.

The elements of the system will be described in detail.

Initially, the controller 110 will be described.

The controller 110 is implemented by a processor and a memory. The processor is a CPU, a graphics processing unit (GPU), or the like. The controller 110 includes a receiving unit 111, a number-of-times determining unit 112, a startup unit 113, and a notification unit 114 as function modules. These function modules may be implemented by the controller 110 running programs.

The receiving unit 111 receives the view request from the information terminal 200 of the user. The view request provides instructions to send captured data captured by the onboard camera 310 of the vehicle 300 to the information terminal 200 or the like. The receiving unit 111 may communicate with the information terminal 200 via the communication unit 130 by wireless communication or wired communication.

The number-of-times determining unit 112 counts the number of requests, which is the number of times the view request is received in a past predetermined period, after the receiving unit 111 receives the view request. In other words, after the receiving unit 111 receives the view request, the number-of-times determining unit 112 determines that the received view request is the Yth view request in a period X. Then, the number-of-times determining unit 112 determines whether the number of requests the view request is received from the information terminal 200 in the past predetermined period is smaller than the first threshold.

When the number-of-times determining unit 112 determines that the number of requests the view request is received from the information terminal 200 in the past predetermined period is smaller than the first threshold, the startup unit 113 executes a startup process of one or multiple in-vehicle devices used to acquire the captured data or send the captured data. Here, the one or multiple in-vehicle devices include the onboard camera 310, or the in-vehicle terminal 320, or both. Specifically, when the number-of-times determining unit 112 determines that the number of requests is smaller than the first threshold, the startup unit 113 sends a signal for instructing one or multiple in-vehicle devices to start up.

When the number-of-times determining unit 112 determines that the number of requests the view request is received from the information terminal 200 in the past predetermined period is larger than or equal to the first threshold, the startup unit 113 does not execute the startup process of the one or multiple in-vehicle devices used to send the captured data. Specifically, when the number-of-times determining unit 112 determines that the number of requests is larger than or equal to the first threshold, the startup unit 113 does not send the signal for instructing the one or multiple in-vehicle devices to start up.

When the number-of-times determining unit 112 determines that the number of requests in the past predetermined period is larger than or equal to the first threshold, the notification unit 114 sends, to the information terminal 200, a notification indicating that acquisition of the captured data is not possible. The notification unit 114 may send a signal for causing the information terminal 200 to output a screen for notifying the user that acquisition of the captured data is not possible.

Next, the component elements, other than the controller 110, of the information processing apparatus 100 will be described.

The storage unit 120 is made up of a main storage device, such as a RAM and a ROM, and an auxiliary storage device, such as an EPROM, a hard disk drive, and a removable medium. An operating system (OS), various programs, various tables, and the like are stored in the auxiliary storage device. Various functions that match predetermined purposes of units of the controller 110 can be implemented by running the programs stored in the auxiliary storage device. One or some or all of the functions may be implemented by a hardware circuit, such as an ASIC and an FPGA.

The storage unit 120 stores data and the like used or generated in processes that are executed by the controller 110.

The communication unit 130 is made up of a communication circuit that performs wireless communication. The communication unit 130 may be, for example, a communication circuit that performs wireless communication using 4th Generation (4G) or a communication circuit that performs wireless communication using 5th Generation (5G). The communication unit 130 may be a communication circuit that performs wireless communication using Long Term Evolution (LTE) or may be a communication circuit that performs communication that conforms with LPWA. The communication unit 130 may include a wired communication circuit and may, for example, communicate with the information terminal 200 or the like connected to the communication unit 130 by wired connection.

Next, apparatuses other than the information processing apparatus 100 will be described.

Initially, the information terminal 200 will be described. The controller 210 of the information terminal 200 is implemented by a processor and a memory. The processor is a CPU, a GPU, or the like. The controller 210 includes a view request unit 211, a receiving unit 212, the storage unit 220, the communication unit 230, and the display unit 240 as function modules. These function modules may be implemented by the controller 210 running programs.

The view request unit 211 sends the view request to the information processing apparatus 100 to instruct the information processing apparatus 100 to send captured data captured by the onboard camera 310 of the vehicle 300 to the information terminal 200 or the like.

The receiving unit 212 receives captured data captured by the onboard camera 310 and sent from the information processing apparatus 100 in response to the view request sent by the view request unit 211. The display unit 240 is caused to output the received captured data. When the number of requests counted by the number-of-times determining unit 112 in the past predetermined period is larger than or equal to the first threshold, the receiving unit 212 receives, from the information processing apparatus 100, a notification indicating that acquisition of the captured data is not possible. The receiving unit 212 causes the display unit 240 to output a screen displaying the received notification. The receiving unit 212 may cause a voice output unit to output a voice indicating the details of the received notification.

The storage unit 220 is made up of a main storage device, such as a RAM and a ROM, and an auxiliary storage device, such as an EPROM, a hard disk drive, and a removable medium. An operating system (OS), various programs, various tables, and the like are stored in the auxiliary storage device. Various functions that match predetermined purposes of units of the controller 210 can be implemented by running the programs stored in the auxiliary storage device. One or some or all of the functions may be implemented by a hardware circuit, such as an ASIC and an FPGA.

The storage unit 220 stores data and the like used or generated in processes that are executed by the controller 210.

The communication unit 230 is made up of a communication circuit that performs wireless communication. The communication unit 230 may be, for example, a communication circuit that performs wireless communication using 4G or may be a communication circuit that performs wireless communication using 5G. The communication unit 230 may be a communication circuit that performs wireless communication using LTE or may be a communication circuit that performs communication that conforms with LPWA. The communication unit 230 may include a wired communication circuit and may, for example, communicate with the information processing apparatus 100 or the like connected to the communication unit 230 by wired connection.

The display unit 240 is a display that displays an image or the like. The display unit 240 may be a touch panel display, an organic electroluminescence (EL) display, or a liquid crystal display.

Next, apparatuses of the vehicle 300 will be described.

The onboard camera 310 is a digital camera including an imaging device, such as a complementary metal oxide semiconductor (CMOS) sensor, and is mounted on the vehicle 300. The onboard camera 310 may be, for example, provided in a drive recorder or the like of the vehicle 300 or may be a digital camera installed independently of a drive recorder. The number of onboard cameras 310 may be one or may be multiple. The onboard camera 310 is capable of capturing an image ahead, an image behind, images to the sides, and an image in the interior of the vehicle 300.

The in-vehicle terminal 320 is an audio visual (AV) device that outputs a voice content, a video content, or the like. The in-vehicle terminal 320 may output a screen or voice of a service provided by the car navigation system.

The in-vehicle terminal 320 is configured to be capable of acquiring captured data acquired by the onboard camera 310. The in-vehicle terminal 320 may record the captured data acquired by the onboard camera 310 in a predetermined storage device. The in-vehicle terminal 320 can also send captured data obtained in real time to an external apparatus in response to a request from the external apparatus.

The communication unit 330 is made up of a communication circuit that performs wireless communication. The communication unit 330 may be, for example, a communication circuit that performs wireless communication using 4G or a communication circuit that performs wireless communication using 5G. The communication unit 330 may be a communication circuit that performs wireless communication using LTE or may be a communication circuit that performs communication that conforms with LPWA. The communication unit 330 may include a wired communication circuit and may, for example, communicate with the information processing apparatus 100 connected to the communication unit 330, the information terminal 200, or the like, by wired connection. The communication unit 330 may be implemented as a data communication module (DCM). Here, the DCM is a communication instrument dedicated for in-vehicle devices. When the communication unit 330 is implemented as a DCM, the communication unit 330 may include a CPU and a memory.

The ECU 340 is an onboard computer that electronically controls drive of the vehicle 300, such as engine control and transmission control, various in-vehicle devices, such as an airbag and a car navigation system, and the like. The ECU 340 includes a microcontroller and a memory. The vehicle 300 may be equipped with a plurality of the ECUs 340.

Even when a vehicle system is stopped, the ECU 340 is capable of causing a selected in-vehicle device to be supplied with electric power and causing the in-vehicle device to start up.

The ECU 340 may receive instructions for starting up the in-vehicle device including the onboard camera 310 or the like, mounted on the vehicle 300 from the information processing apparatus 100. Then, the ECU 340 may start up the in-vehicle device based on the instructions. The ECU 340 may send captured data captured by the onboard camera 310 to the information processing apparatus 100. In other words, the ECU 340 may relay instructions that the information processing apparatus 100 sends to the in-vehicle device mounted on the vehicle 300.

The configuration shown in FIG. 2 is an example. One or some or all of the functions shown in the drawing may be executed using a circuit designed exclusively. Programs may be stored or run by a combination of a main storage device and an auxiliary storage device, other than illustrated.

Figure 3:
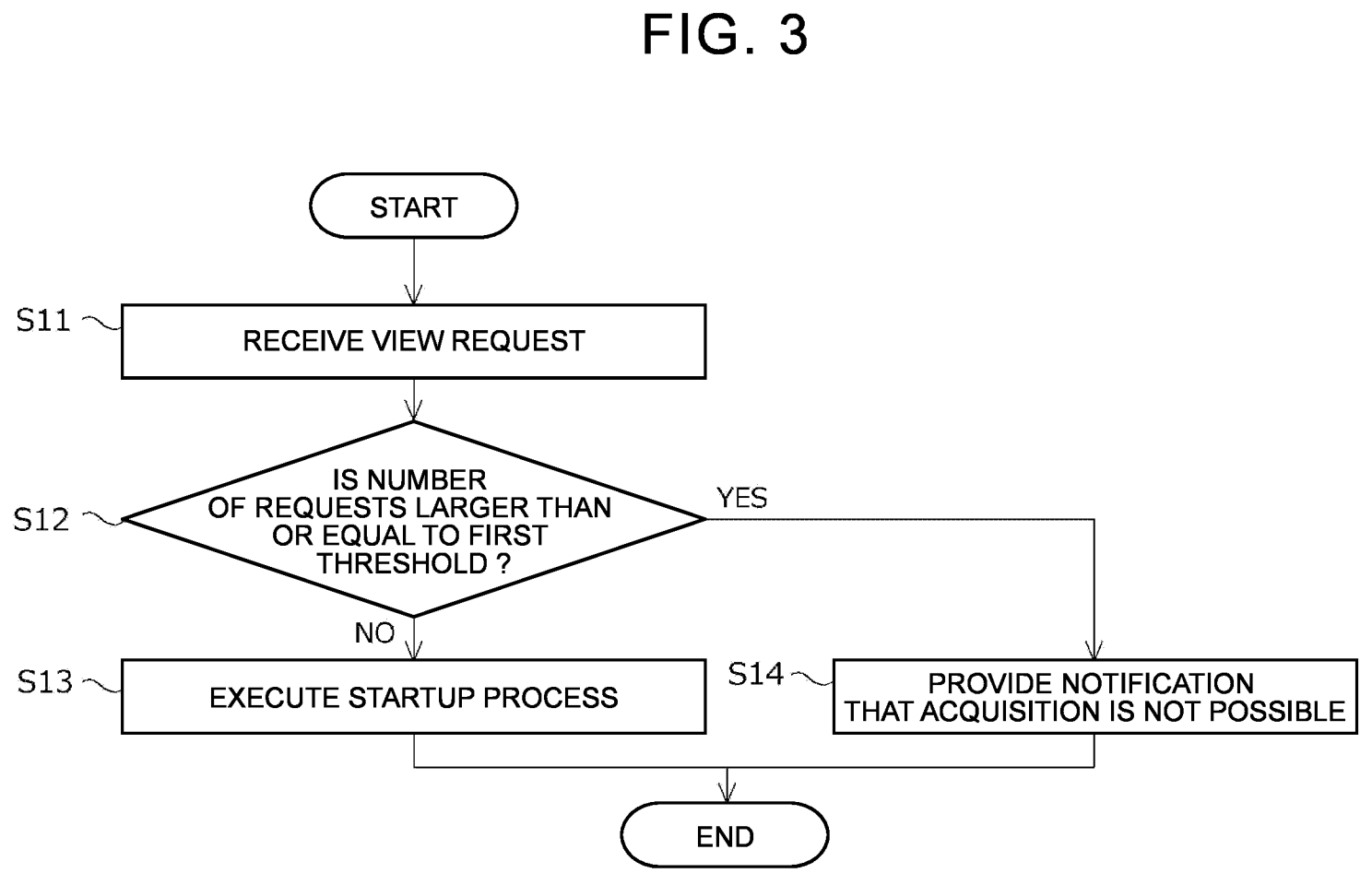

Next, specific details of a process executed by the information processing apparatus 100 will be described. FIG. 3 is a flowchart of a process that the controller 110 executes. The illustrated process is repeatedly executed during a stop of the vehicle 300. Before step S11 is started, the vehicle 300 is in a state where the driving system is stopped, typically, an ignition switch is off. Alternatively, the vehicle 300 is in a state where a main switch is off.

Initially, in step S11, the receiving unit 111 receives, from the information terminal 200, a view request that is a signal providing instructions to send captured data captured by the onboard camera 310 of the vehicle 300. The receiving unit 111 may be configured to be capable of receiving the view request from a plurality of different information terminals 200.

Subsequently, in step S12, the number-of-times determining unit 112 determines whether the number of requests the view request is received from the information terminal 200 in the past predetermined period is larger than or equal to the first threshold. In other words, after the receiving unit 111 receives the view request, the number-of-times determining unit 112 counts the number of requests, which is the number of times the view request is received in the past predetermined period, and determines whether the counted number of requests is larger than or equal to the first threshold. In counting the number of requests, after the receiving unit 111 receives the view request, the number-of-times determining unit 112 may execute a determination process for determining that the received view request is the Yth view request in the period X, as a specific process. When the number of the information terminals 200 configured to send the view request is multiple, the number-of-times determining unit 112 may count an accumulated number of times the view request is received from the information terminals 200.

When the number-of-times determining unit 112 determines that the number of requests the view request is received from the information terminal 200 in the past predetermined period is larger than or equal to the first threshold, the determination is affirmative in this step.

When the determination is affirmative in this step, the process proceeds to step S14.

When the determination is negative in this step, the process proceeds to step S13.

When the process proceeds to step S13, the startup unit 113 executes a startup process of one or multiple in-vehicle devices used to acquire the captured data or send the captured data. In other words, the startup unit 113 sends, to one or multiple in-vehicle devices, a signal instructing the one or multiple in-vehicle devices to start up. The startup unit 113 may send, to a DC-DC converter, a signal instructing the DC-DC converter to start up. The DC-DC converter is used to supply transformed electric power to the one or multiple in-vehicle devices.

When the process proceeds to step S14, the notification unit 114 sends, to the communication unit 230 of the information terminal 200, a notification indicating that acquisition of the captured data is not possible. When the process proceeds to step S14, the startup unit 113 does not execute the startup process of the one or multiple in-vehicle devices used to acquire the captured data or send the captured data. In other words, the startup unit 113 does not send, to the one or multiple in-vehicle devices, a signal instructing the one or multiple in-vehicle devices to start up. The plurality of in-vehicle devices may include a DC-DC converter for supplying transformed electric power to another in-vehicle device.

When the information terminal 200 receives, from the notification unit 114 of the information processing apparatus 100, the notification indicating that acquisition of the captured data is not possible, the information terminal 200 outputs a screen showing the details of the notification to the display unit 240.

Figure 4:
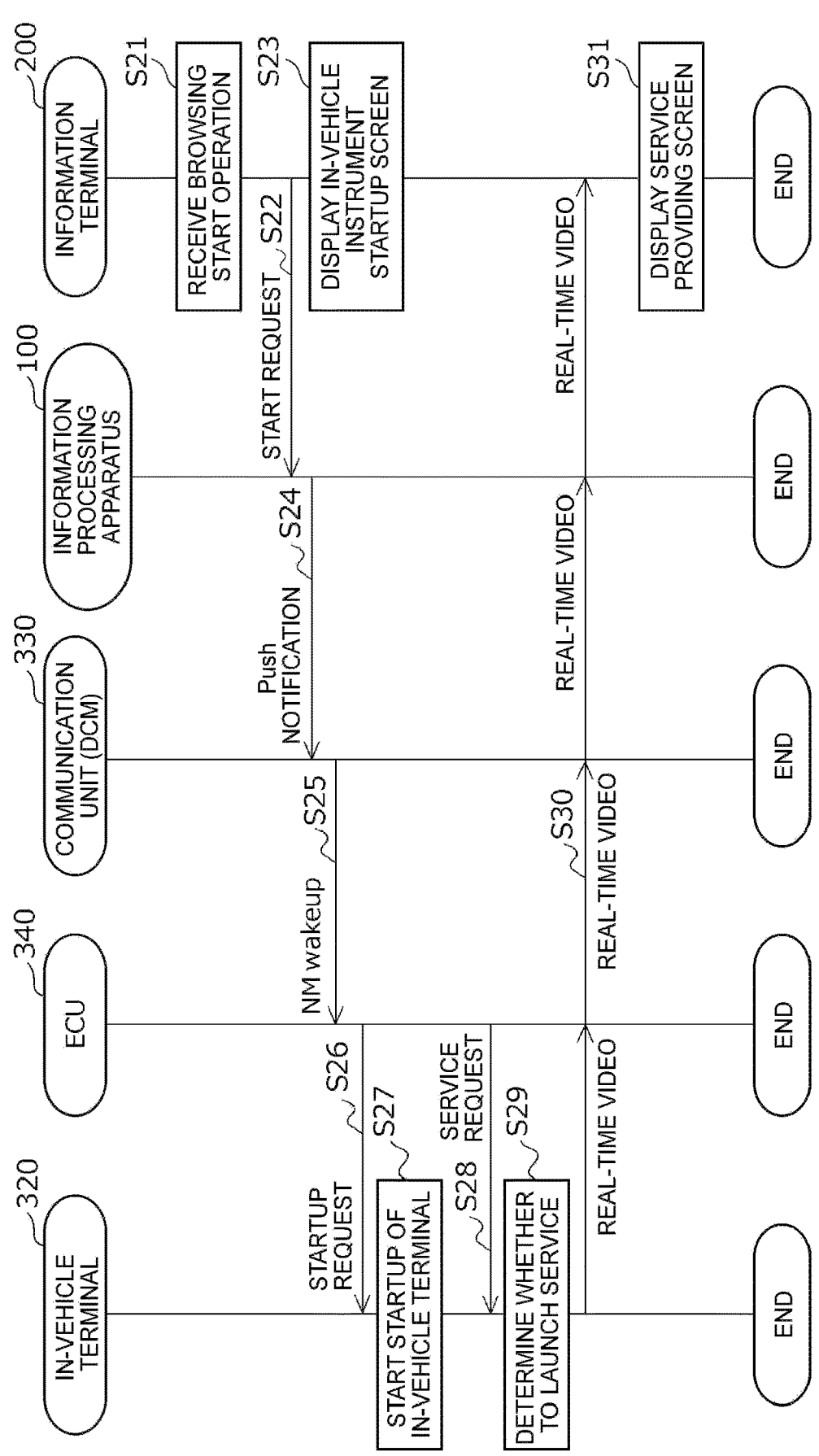
FIG. 4 is a sequence diagram of a process that is executed by the system according to the first embodiment.

Next, a process that is executed by the system including the information processing apparatus 100 will be described. FIG. 4 is a sequence diagram of the process that is executed by the system according to the first embodiment.

Initially, the in-vehicle terminal 320 and the ECU 340 are in a power-off state. For example, the in-vehicle terminal 320 and the ECU 340 are in a state where the main power is off. Here, the ECU 340 is an electronic control unit that is a computer that electronically controls drive of the vehicle 300.

Subsequently, in step S21, the information terminal 200 receives operation for starting browsing performed by the user. For example, the information terminal 200 detects that an icon for starting browsing, displayed on the display unit 240 of the information terminal 200, is depressed.

Subsequently, in step S22, the information terminal 200 sends a start request to the information processing apparatus 100. Here, the start request is a signal that causes the information processing apparatus 100 to send a trigger to start the process that is executed by the information processing apparatus 100, to the communication unit 330 mounted on the vehicle 300. Here, the communication unit 330 is typically a DCM. The information terminal 200 may communicate with the information processing apparatus 100 via a wide area network, such as the Internet.

Subsequently, in step S23, the information terminal 200 displays, on the display unit 240, a screen indicating that the in-vehicle terminal 320 is starting up. A scene indicating that the in-vehicle terminal 320 is starting up includes a screen indicating a stand-by state until the in-vehicle terminal 320 starts up.

Subsequently, in step S24, the information processing apparatus 100 sends a signal for starting up the in-vehicle terminal 320 (and the onboard camera 310) to the communication unit 330. The signal may be sent via push notification through a predetermined application programming interface (API).

Subsequently, in step S25, the communication unit 330 sends a wakeup signal in network management (NM) to the ECU 340. In other words, the communication unit 330 sends a wakeup signal in a controller area network (CAN) communication protocol to the ECU 340. Here, the communication unit 330 is a wireless communication module dedicated for in-vehicle devices. The communication unit 330 functions as a gateway that relays between an in-vehicle network and an external network.

Subsequently, in step S26, the ECU 340 sends a startup request to the in-vehicle terminal 320. Here, the startup request is a signal for causing the in-vehicle terminal 320 to start up the host apparatus. At the same time, the ECU 340 starts up the DC-DC converter of the vehicle 300 to start supplying electric power to the in-vehicle terminal 320 and the onboard camera 310.

The in-vehicle terminal 320 having received the startup request starts to start up in step S27. Thus, the in-vehicle terminal 320 is in a power-on state.

Subsequently, in step S28, the in-vehicle terminal 320 receives a service request from the ECU 340. Here, the service request is instructions to make a request of the in-vehicle terminal 320 to acquire captured data captured by the onboard camera 310 and send the acquired captured data to the information processing apparatus 100.

Subsequently, in step S29, the in-vehicle terminal 320 determines whether to launch a service provided by the in-vehicle terminal 320. Here, the service provided by the in-vehicle terminal 320 includes acquiring captured data captured by the onboard camera 310 and sending captured data captured by the onboard camera 310 to the information processing apparatus 100.

Subsequently, in step S30, the in-vehicle terminal 320 sends a real-time video captured by the onboard camera 310 (hereinafter, referred to as real-time video) to the information processing apparatus 100, and the information processing apparatus 100 provides the real-time video to the information terminal 200. Specifically, the in-vehicle terminal 320 may send a real-time video to the ECU 340 on the CAN network, and the ECU 340 may send the real-time video to the information processing apparatus 100 via the communication unit 330 and an external wide area network or the like.

The information terminal 200 having received the real-time video displays a service providing screen in step S31. Specifically, the information terminal 200 outputs an interface for displaying the real-time video acquired from the information processing apparatus 100.

When operation to terminate acquisition of a real-time video is performed on the information terminal 200, the information terminal 200 sends instructions to the information processing apparatus 100 to stop sending the real-time video. Then, based on this, the information processing apparatus 100 sends instructions to stop sending a real-time video to the ECU 340 via the communication unit 330. The ECU 340 having received instructions to stop sending the real-time video sends instructions to the in-vehicle terminal 320 to stop the operation. The in-vehicle terminal 320 having received instructions to stop the operation stops the operation and enters a power-off state. Similarly, the DC-DC converter having received instructions to stop the operation from the ECU 340 stops the operation.

As described above, the information processing apparatus 100 according to the present embodiment determines whether to execute the startup process of the in-vehicle devices including the onboard camera 310 and the like, mounted on the vehicle 300, in accordance with the number of requests. The number of requests is the number of times the view request making a request for acquisition of captured data captured by the onboard camera 310 is received. The view request is sent from the information terminal 200. Specifically, the controller 110 executes the startup process of the in-vehicle device when the number of requests is smaller than the first threshold and restricts the startup process of the in-vehicle device when the number of requests is larger than or equal to the first threshold. With the above configuration, the information processing apparatus 100 can extend the lifespan of the in-vehicle device that is driven while the driving system of the vehicle 300 is off.

The information processing apparatus 100 may be implemented as a server apparatus located at a place apart from the vehicle 300 or may be implemented as one of devices mounted on the vehicle 300. For example, the information processing apparatus 100 may be implemented as the above-described in-vehicle terminal 320. In this case, the in-vehicle terminal 320 may directly communicate with the information terminal 200.

First Modification of First Embodiment

In the first embodiment, the information processing apparatus 100 counts the number of times the view request is received from the information terminal 200 and determines whether to execute the startup process of the in-vehicle device based on the count. On the other hand, the number of times the view request is issued may be counted by the information terminal 200. In the present modification, the information terminal 200 counts the number of times the view request is issued (the number of requests) in a past predetermined period and, when the number of requests exceeds a threshold, stops issuing the view request to the information processing apparatus 100.

In the present modification, at time when the information terminal 200 sends the view request to the information processing apparatus 100, the information terminal 200 records a sending history of the view request in the storage unit 220. The information terminal 200 counts the number of times the view request is sent (the number of requests) in a past predetermined period and, when the number of requests is larger than or equal to the first threshold, does not send the view request to the information processing apparatus 100. In this case, the information terminal 200 may output a notification that viewing of a video is not possible. In this way, when the information terminal 200 determines whether to issue the view request, it is possible to extend the lifespan of the in-vehicle device as in the case of the first embodiment. In the above configuration, the information processing apparatus 100 may be configured to unconditionally execute the startup process of the in-vehicle device in response to the view request sent from the information terminal 200.

Second Modification of First Embodiment

In the first embodiment, the information processing apparatus 100 switches whether to execute the startup process of the in-vehicle device based on the number of requests, which is the number of times the view request is received. In contrast, in the present modification, the information processing apparatus 100 switches whether to execute the startup process of the in-vehicle device based on the number of times of startup of the DC-DC converter mounted on the vehicle 300.

In the first embodiment, the information processing apparatus 100 counts the number of times the view request is received from the information terminal 200 and, when the number of requests, which is the number of times of the view request, is larger than or equal to the first threshold, restricts the startup process of the in-vehicle device. On the other hand, in the present modification, the information processing apparatus 100 acquires an accumulated number of times of converter startup, which is a total of the number of times the DC-DC converter mounted on the vehicle 300 is started up, and, when the accumulated number of times of converter startup is larger than or equal to the first threshold, restricts the startup process of the in-vehicle device. The accumulated number of times of converter startup may be a total of the number of times the DC-DC converter is started up in a past predetermined period. The accumulated number of times of converter startup may be, for example, recorded by the ECU 340. At this time, the ECU 340 may acquire the number of times of startup of the DC-DC converter in the predetermined period or may send the number of times of startup to the information processing apparatus 100.

Figure 5:
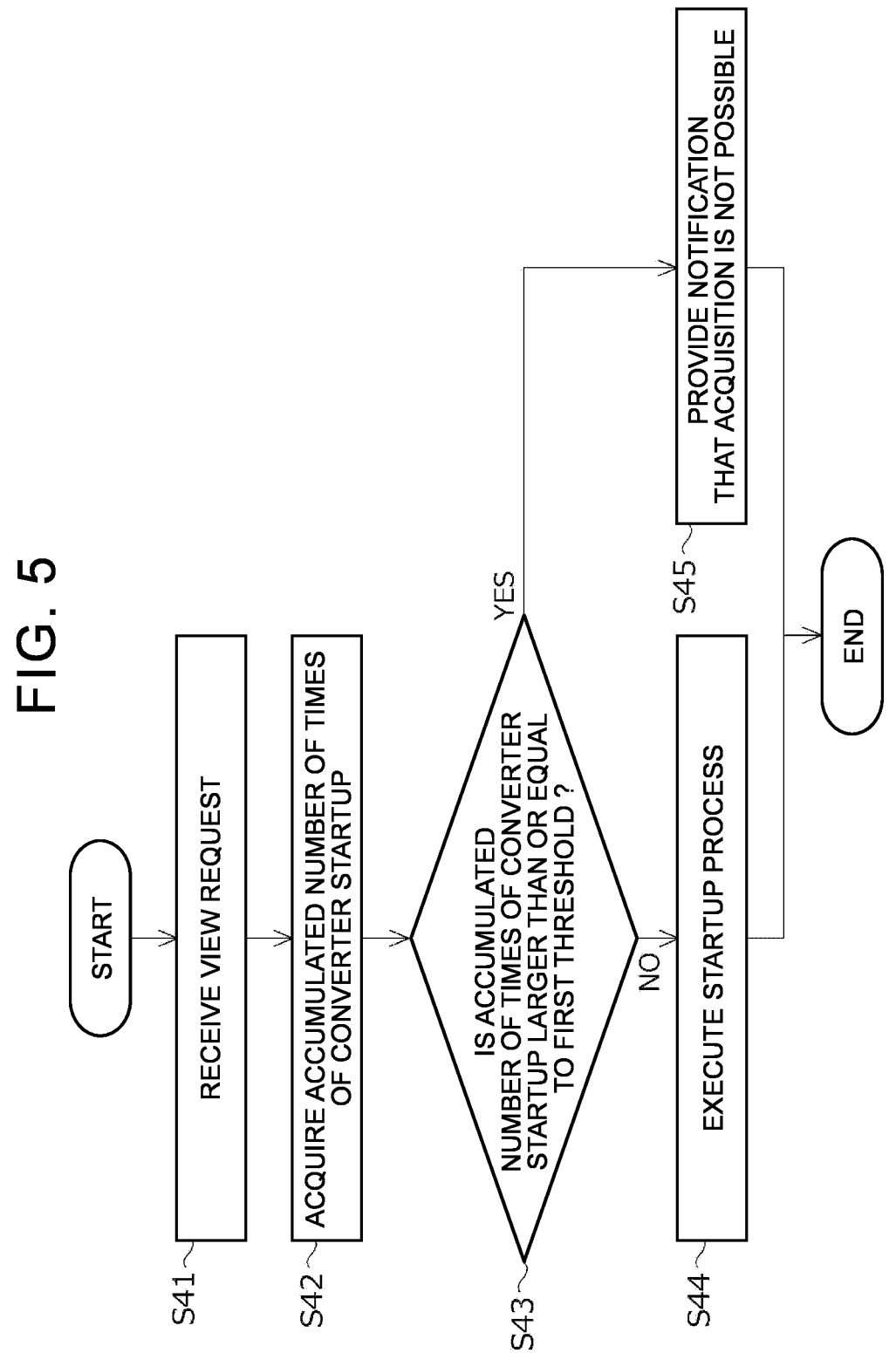
FIG. 5 is a flowchart of a process that is executed by a controller of an information processing apparatus according to a second modification of the first embodiment.

FIG. 5 is a flowchart of a process that is executed by the controller 110 of the information processing apparatus 100 according to the second modification of the first embodiment. In the present modification, the information processing apparatus 100 executes the process shown in FIG. 5 instead of the process shown in FIG. 3.

Initially, in step S41, the receiving unit 111 receives, from the information terminal 200, the view request that is a signal providing instructions to send captured data captured by the onboard camera 310 of the vehicle 300.

In step S42, the receiving unit 111 acquires the accumulated number of times of converter startup, which is a total of the number of times of startup of the DC-DC converter mounted on the vehicle 300. The receiving unit 111 may acquire the accumulated number of times of converter startup from the ECU 340. Here, the accumulated number of times of converter startup may be the number of times of startup of the DC-DC converter over the entire period from when the vehicle 300 is manufactured or may be the number of times of startup of the DC-DC converter in the past predetermined period.

Subsequently, in step S43, the number-of-times determining unit 112 determines whether the accumulated number of times of converter startup is larger than or equal to the first threshold.

When the number-of-times determining unit 112 determines that the accumulated number of times of converter startup is larger than or equal to the first threshold, the determination is affirmative in this step.

When the determination is affirmative in this step, the process proceeds to step S45.

When the determination is negative in this step, the process proceeds to step S44.

When the process proceeds to step S44, the startup unit 113 executes the startup process of the one or multiple in-vehicle devices used to acquire the captured data or send the captured data. In other words, the startup unit 113 sends, to the one or multiple in-vehicle devices via the communication unit 330, a signal instructing the one or multiple in-vehicle devices to start up. The startup unit 113 may send, to a DC-DC converter, a signal instructing the DC-DC converter to start up. The DC-DC converter is used to supply transformed electric power to the one or multiple in-vehicle devices.

When the process proceeds to step S45, the notification unit 114 sends, to the communication unit 230 of the information terminal 200, a notification indicating that acquisition of the captured data is not possible. When the process proceeds to step S45, the startup unit 113 does not execute the startup process of the one or multiple in-vehicle devices used to acquire the captured data or send the captured data. In other words, the startup unit 113 does not send, to the one or multiple in-vehicle devices, a signal instructing the one or multiple in-vehicle devices to start up. The plurality of in-vehicle devices may include a DC-DC converter for supplying transformed electric power to another in-vehicle device. When the information terminal 200 receives, from the notification unit 114 of the information processing apparatus 100, the notification indicating that acquisition of the captured data is not possible, the information terminal 200 outputs a screen showing the details of the notification to the display unit 240.

In this way, the information processing apparatus 100 may switch whether to execute the startup process of the in-vehicle device in accordance with a total of the number of times of startup of the DC-DC converter mounted on the vehicle 300.

Second Embodiment

In the first embodiment, the information processing apparatus 100 switches whether to execute the startup process of the in-vehicle device based on the number of requests, which is the number of times the view request is received. Specifically, the information processing apparatus 100 counts the number of times the view request is received from the information terminal 200 and, when the number of times the view request is received in the past predetermined period is larger than or equal to the first threshold, restricts the startup process of the in-vehicle device.

In the aspect of the disclosure, to extend the lifespan of the in-vehicle device, the first threshold used to determine whether to execute the startup process is desirably determined in accordance with a current state of the DC-DC converter. For example, when the number of times of startup of the DC-DC converter is large, it is estimated that the degradation of the DC-DC converter has advanced, so, in such a case, the first threshold is desirably further reduced.

In a second embodiment, to address this situation, the information processing apparatus 100 chooses the first threshold based on the number of times of startup of the DC-DC converter.

Figures 6, 7:
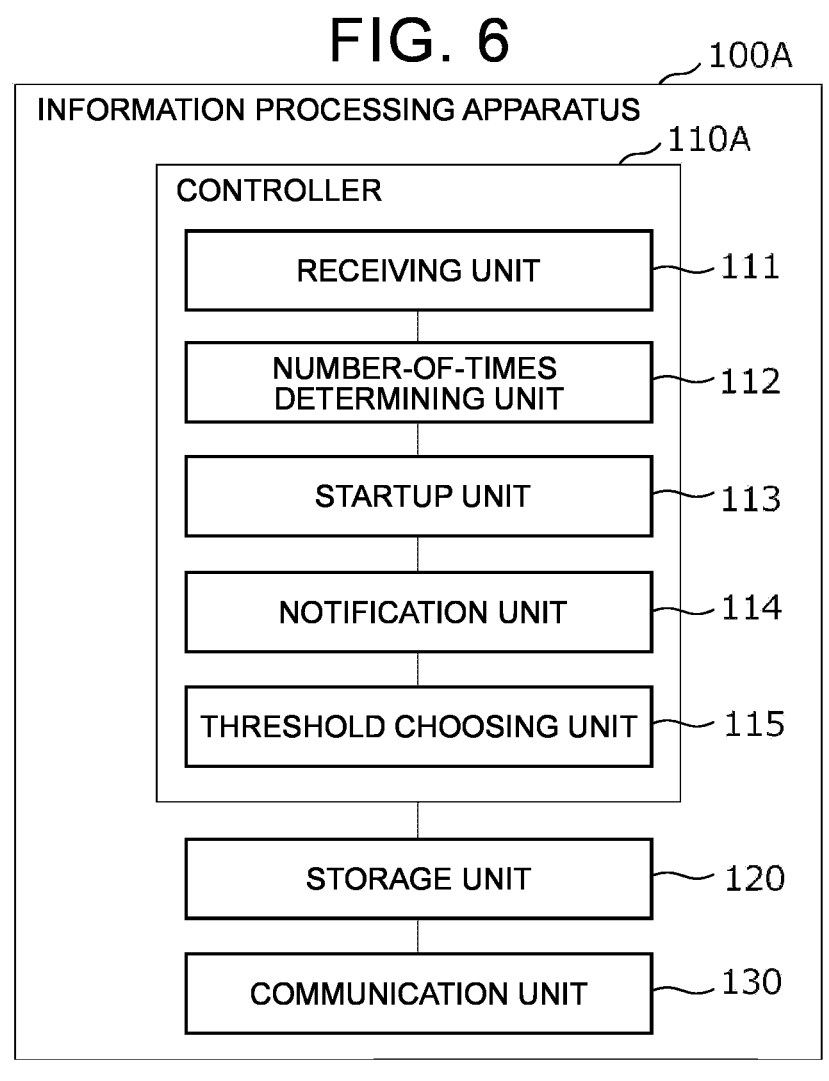
FIG. 6 is a diagram that illustrates component elements of an information processing apparatus according to a second embodiment.
FIG. 7 is a flowchart of a process that is executed by a controller of the information processing apparatus according to the second embodiment.

FIG. 6 is a diagram that illustrates component elements of an information processing apparatus 100A according to the second embodiment. The information processing apparatus 100A according to the second embodiment further includes a threshold choosing unit 115 in addition to the component elements of the information processing apparatus 100 according to the first embodiment.

The threshold choosing unit 115 chooses the first threshold. For example, the threshold choosing unit 115 may choose the first threshold based on the accumulated number of times of converter startup, which is a total of the number of times the DC-DC converter mounted on the vehicle 300 is started up. The threshold choosing unit 115 may set the first threshold to a smaller value as the accumulated number of times of converter startup increases.

With the above configuration, the threshold choosing unit 115 is capable of choosing a further appropriate threshold, so it is possible to extend the lifespan of the DC-DC converter.

In the first embodiment, a fixed value is used for the first threshold for determining whether the number of requests from the information terminal 200 side is large or small. On the other hand, in the second embodiment, the first threshold for determining whether the number of times the view request is sent is large is determined in accordance with the accumulated number of times of converter startup, which directly influences the lifespan of the DC-DC converter. In other words, in the second embodiment, the threshold choosing unit 115 variably chooses the first threshold in accordance with the accumulated number of times of converter startup.

FIG. 7 is a flowchart of a process that is executed by a controller 110A according to the second embodiment. The process is executed between step S11 and step S12 or between step S41 and step S42.

In step S51, the receiving unit 111 acquires the accumulated number of times of converter startup. The receiving unit 111 communicates with the ECU 340 and acquires through a wide area network or the like via the communication unit 130 information on the accumulated number of times of converter startup, acquired by the ECU 340 through the CAN network from the DC-DC converter. Alternatively, the receiving unit 111 may acquire information on the accumulated number of times of converter startup from the ECU 340 via the communication unit 130 by wired communication.

Subsequently, in step S52, the threshold choosing unit 115 chooses the first threshold based on the accumulated number of times of converter startup. The threshold choosing unit 115 may select the first threshold set in advance for the accumulated number of times of converter startup or may calculate the first threshold by using the accumulated number of times of converter startup in accordance with a predetermined algorithm.

For example, the threshold choosing unit 115 may set the first threshold to a smaller value as the accumulated number of times of converter startup increases. In other words, the threshold choosing unit 115 may set the first threshold in proportion to the accumulated number of times of converter startup.

Thus, the threshold choosing unit 115 is capable of choosing a further appropriate first threshold in accordance with the accumulated number of times of converter startup.

After step S52, the process proceeds to step S12 when the process proceeds from step S11 to step S51; the process proceeds to step S42 when the process proceeds from step S41 to step S51.

Third Embodiment

In the second embodiment, the information processing apparatus 100A chooses the first threshold based on the accumulated number of times of startup of the DC-DC converter. However, a desired level of the remaining lifespan of the DC-DC converter depends on a contract of the vehicle 300. When, for example, the vehicle 300 is a leased vehicle, it is presumable that the vehicle 300 is returned after the lease ends and then reused, so it may be desired to further suppress the degradation of the DC-DC converter.

In a third embodiment, to address this situation, the information processing apparatus 100 chooses the first threshold based on the contract of the vehicle 300.

Figure 8:
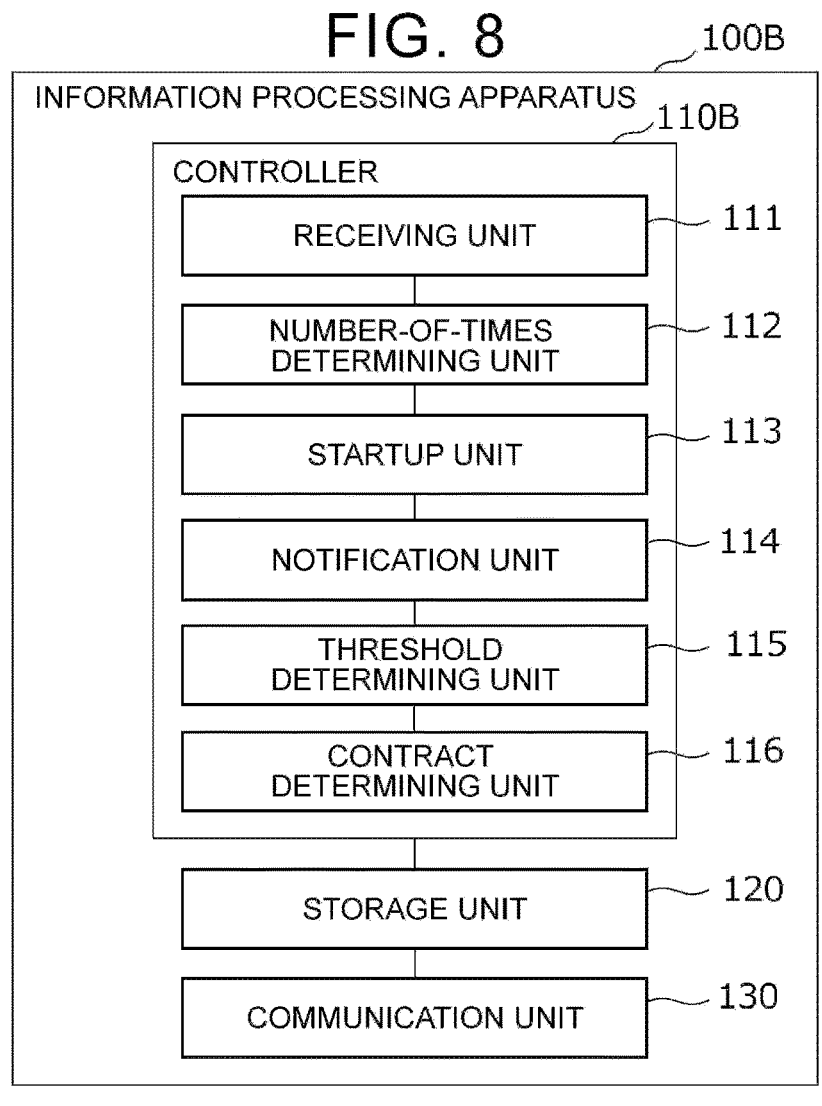
FIG. 8 is a diagram that illustrates component elements of an information processing apparatus according to a third embodiment.

FIG. 8 is a diagram that illustrates component elements of an information processing apparatus 100B according to the third embodiment. The information processing apparatus 100B according to the third embodiment further includes a contract determining unit 116 in addition to the component elements of the information processing apparatus 100A according to the second embodiment.

The contract determining unit 116 determines whether the vehicle 300 is a vehicle temporarily rented to the user or a vehicle owned by the user. For example, the contract determining unit 116 determines whether the vehicle 300 is a vehicle rented to the user by lease or a vehicle purchased by the user. The contract determining unit 116 may read information on the contract of the vehicle 300, stored in advance in the ECU 340 or the like of the vehicle 300, and execute the above-described determination process. Alternatively, the contract determining unit 116 may read an identifier (for example, vehicle identification number (VIN)) of the vehicle 300, stored in advance in the vehicle 300, and acquire, from an external server apparatus or the like, information on the contract of the vehicle 300 corresponding to the identifier.

In the third embodiment, the threshold choosing unit 115 chooses the first threshold based on the contract of the vehicle 300, determined by the contract determining unit 116. When, for example, the vehicle 300 is a vehicle temporarily rented to the user, the threshold choosing unit 115 may set the first threshold to a smaller value as compared to when the user owns the vehicle 300.

When the threshold choosing unit 115 executes the above operation, the threshold choosing unit 115 is capable of choosing a further appropriate first threshold for ensuring a desired lifespan of the DC-DC converter according to a contract with the user of the vehicle 300.

Figure 9:
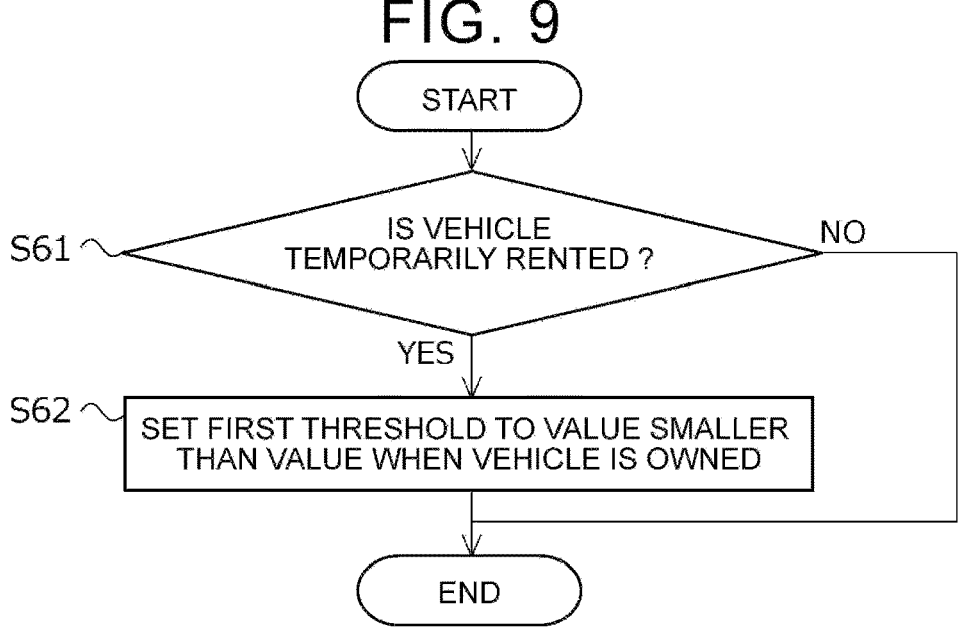
FIG. 9 is a flowchart of a process that is executed by a controller of the information processing apparatus according to the third embodiment.

FIG. 9 is a flowchart of a process that is executed by a controller 110B of the information processing apparatus 100B according to the third embodiment. The process is executed after step S11 or after step S41.

In step S61, the contract determining unit 116 determines whether the vehicle 300 is a vehicle temporarily rented to the user. In this step, the contract determining unit 116 reads information on the contract of the vehicle 300, stored in advance in the ECU 340 or the like of the vehicle 300, and determines whether the vehicle 300 is a vehicle temporarily rented to the user. Alternatively, the contract determining unit 116 determines whether the vehicle 300 is a vehicle temporarily rented to the user, based on information on the contract of the vehicle 300, acquired from an external server apparatus or the like. When the contract determining unit 116 determines that the vehicle 300 is a vehicle temporarily rented to the user, the determination is affirmative in this step.

When the determination is affirmative in step S61, the process proceeds to step S62.

When the determination is negative in step S61, the process ends.

When the process proceeds to step S62, the threshold choosing unit 115 sets the first threshold to a value smaller than a default value. The default value is a value that is applied when the vehicle 300 is owned by the user. In other words, the threshold choosing unit 115 sets the first threshold to a smaller value when the determination is affirmative in step S61 than a value that is used when the vehicle 300 is owned by the user (that is, when the determination is negative in step S61).

After step S62, the process proceeds to step S12 when the process proceeds from step S11 to step S61; the process proceeds to step S42 when the process proceeds from step S41 to step S61.

Fourth Embodiment

In the first embodiment, the information processing apparatus 100 switches whether to execute the startup process of the in-vehicle device based on the number of requests, which is the number of times the view request is received. In other words, in the first embodiment, when the number of requests satisfies the condition, a video is allowed to be viewed without limit.

Here, assuming a case where there is a limit on video view time per each view request or data communication traffic per each view request. For example, in a vehicle monitoring service provided by a business operator, it is assumed that various limits are provided on data communication. In such an example, for example, it is conceivable that an upper limit is imposed on video view time or data communication traffic per each view request. In this case, when a limit is imposed during viewing of a video, viewing can be interrupted.

In this case, the user may repeatedly send the view request and, as a result, increase the number of times of startup of the in-vehicle device. To solve this inconvenience, it is desirable that the user be caused to change the details of the contract (communication contract) of a monitoring service to ease a captured data acquisition time limit per each view request or a data communication traffic limit per each view request. Thus, it is possible to reduce a situation in which the user repeatedly sends the view request and, as a result, the number of times of startup of the in-vehicle device increases.

In a fourth embodiment, to address this situation, when the information processing apparatus 100 provides a notification, to the information terminal 200, that acquisition of the captured data is not possible, the information processing apparatus 100 proposes, to the user, a communication contract to increase captured data acquisition time per each view request or data communication traffic per each view request.

When the notification unit 114 sends a notification, to the communication unit 230 of the information terminal 200, that acquisition of the captured data is not possible, the notification unit 114 further sends a notification to propose a contract to increase captured data acquisition time per each view request or data communication traffic per each view request.

When the notification unit 114 executes the above operation, it is possible to lead the user to a contract plan in which an opportunity to send the view request reduces, so it is possible to suppress the number of times of startup of the in-vehicle device.

Figure 10:
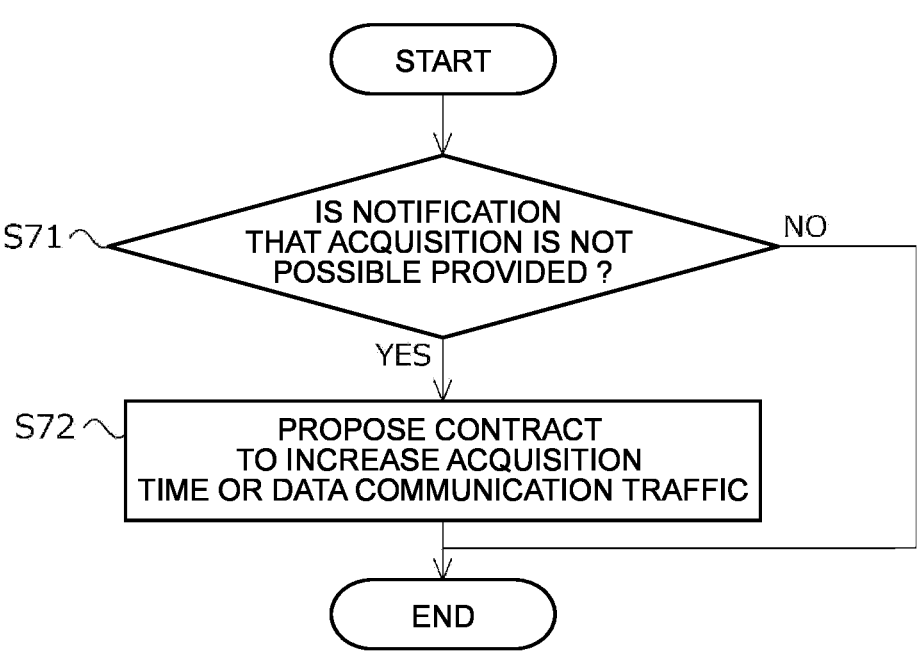
FIG. 10 is a flowchart of a process that is executed by a controller of an information processing apparatus according to a fourth embodiment.

FIG. 10 is a flowchart of a process that is executed by the controller 110 of the information processing apparatus 100 according to the fourth embodiment. The process is executed after the processes of step S11 to step S14 are complete.

Initially, in step S71, the controller 110 determines whether the notification unit 114 has sent a notification, to the communication unit 230 of the information terminal 200, that acquisition of the captured data is not possible. When the controller 110 determines that the notification unit 114 has sent a notification, to the communication unit 230 of the information terminal 200, that acquisition of the captured data is not possible, the determination is affirmative in this step.

When the determination is affirmative in step S71, the process proceeds to step S72.

When the determination is negative in step S71, the process ends.

When the process proceeds to step S71, the notification unit 114 sends, to the communication unit 230 of the information terminal 200, a notification to propose a contract to increase captured data acquisition time per each view request or data communication traffic per each view request.

According to the fourth embodiment, it is possible to reduce a situation in which, due to a limit in terms of a communication contract, the user repeatedly sends the view request and, as a result, the number of times of startup of the in-vehicle device increases.

Modifications

The above-described embodiments are only illustrative, and the disclosure can be implemented with modifications as needed without departing from the purport of the disclosure.

For example, the processes and devices described in this disclosure may be freely implemented in combination without any technical contradiction.

In the first embodiment, whether to start up the in-vehicle device is determined based on the number of times the view request is received from the information terminal 200 in the past predetermined period, and then acquisition of the captured data is started. However, if viewing of a video is permitted without limit, communication costs may increase. Therefore, even after acquisition and sending of the captured data are started, acquisition of the captured data may be interrupted depending on conditions.

When, for example, each view time of a video by the user exceeds a second threshold, the information processing apparatus 100 may interrupt acquisition of the captured data from the in-vehicle terminal 320.

Similarly, when data communication traffic occurred in each view of a video by the user (for example, data communication traffic occurred between the information processing apparatus 100 and the vehicle 300) exceeds a third threshold, the information processing apparatus 100 may interrupt acquisition of the captured data from the in-vehicle terminal 320.

In the above example, each view time (data communication traffic) is used as a reference. Alternatively, view time (data communication traffic) in a past predetermined period may be used as a reference.

A process described as the one that is performed by a device may be shared and performed by multiple devices. Alternatively, processes described as the ones that are respectively performed by different devices may be performed by a device. In a computer system, what hardware configuration (server configuration) implements functions may be flexibly changed.

The disclosure may also be implemented as follows. A computer is supplied with a computer program having the functions described in the above-described embodiments, and one or more processors of the computer read out and run the program. Such a computer program may be provided to a computer with a non-transitory computer-readable storage medium connectable to a system bus of the computer or may be provided to a computer via a network. Examples of the non-transitory computer-readable storage medium include a disk or disc of any type, such as a magnetic disk (floppy (registered trademark) disk, a hard disk drive (HDD), or the like), an optical disc (CD-ROM, DVD disc, a Blue-ray disc, or the like), a read only memory (ROM), a random access memory (RAM), an EPROM, an EEPROM, a magnetic card, a flash memory, an optical card, and a medium of any type suitable for storing electronic instructions.

What is claimed is:

1. An information processing apparatus comprising a controller configured to:

execute a startup process of one or multiple in-vehicle devices used to send captured data when a driving system of a first vehicle is not up, a view request is received from a user, and a request number is smaller than a first threshold; and not execute the startup process of the one or multiple in-vehicle devices when the driving system of the first vehicle is not up, the view request is received from the user, and the request number is larger than or equal to the first threshold, wherein the view request is a request to send the captured data captured by an onboard camera of the first vehicle to a predetermined apparatus, the request number is a number that the view request is received from the user in a predetermined period, and the controller is configured to set the first threshold to a smaller value when the first vehicle is a vehicle temporarily rented to the user as compared to when the first vehicle is owned by the user.

2. The information processing apparatus according to claim 1, wherein the controller is configured to:

count a number about the view request received from the user in the predetermined period as the request number; and provide the user with a notification indicating that acquisition of the captured data is not possible when the request number in the predetermined period is larger than or equal to the first threshold.

3. The information processing apparatus according to claim 1, wherein:

the controller is configured to choose the first threshold based on an accumulated number about converter startup;

the accumulated number is a total number about a DC-DC converter being started up; and the DC-DC converter is configured to convert voltage for supplying electric power of a drive battery of the first vehicle to the in-vehicle device.

4. The information processing apparatus according to claim 3, wherein the controller is configured to acquire, from the first vehicle, information on the accumulated number at a predetermined time.

5. The information processing apparatus according to claim 3, wherein the controller is configured to set the first threshold to a smaller value as the accumulated number increases.

6. The information processing apparatus according to claim 2, wherein the controller is configured to propose, to the user, a contract to increase a captured data acquisition time limit or data communication traffic limit per each view request when the controller provides the user with a notification indication that acquisition of the captured data is not possible.

7. The information processing apparatus according to claim 1, wherein the in-vehicle device is the onboard camera or an in-vehicle terminal.

8. The information processing apparatus according to claim 1, further comprising:

an information terminal; and a transmitter configured to perform wireless connection.

9. An information processing method comprising:

executing a startup process of one or multiple in-vehicle devices used to send captured data when a driving system of a first vehicle is not up, a view request is received from a user, and a request number is smaller than a first threshold; and not executing the startup process of the one or multiple in-vehicle devices when the driving system of the first vehicle is not up, the view request is received from the user, and the request number is larger than or equal to the first threshold, wherein the view request is a request to send the captured data captured by an onboard camera of the first vehicle to a predetermined apparatus, the request number is a number that the view request is received from the user in a predetermined period, and the method further comprises setting the first threshold to a smaller value when the first vehicle is a vehicle temporarily rented to the user as compared to when the first vehicle is owned by the user.

10. The information processing method according to claim 9, further comprising:

counting a number about the view request received from the user in the predetermined period as the request number; and providing the user with a notification indicating that acquisition of the captured data is not possible when the request number in the predetermined period is larger than or equal to the first threshold.

11. The information processing method according to claim 9, further comprising choosing the first threshold based on an accumulated number about converter startup, wherein:

the accumulated number is a total of the number about a DC-DC converter being started up; and the DC-DC converter is configured to convert voltage for supplying electric power of a drive battery of the first vehicle to the in-vehicle device.

12. The information processing method according to claim 11, further comprising acquiring, from the first vehicle, information on the accumulated number at a predetermined point in time.

13. The information processing method according to claim 11, further comprising setting the first threshold to a smaller value as the accumulated number of times increases.

14. The information processing method according to claim 10, further comprising proposing, to the user, a contract to increase a captured data acquisition time limit or data communication traffic limit per each view request when a notification indicating that acquisition of the captured data is not possible is provided to the user.

15. The information processing method according to claim 9, wherein the in-vehicle device is the onboard camera or an in-vehicle terminal.

16. An in-vehicle apparatus comprising a controller configured to:

receive, from a predetermined information processing apparatus, an instruction for starting up one or multiple target devices at least including an onboard camera;

start up the one or multiple target devices based on the instruction;

execute a startup process of the one or multiple target devices when a driving system of the vehicle is not up, a view request is received from a user, and a request number is smaller than a first threshold;

not execute the startup process of the one or multiple target devices when the driving system of the vehicle is not up, the view request is received from the user, and the request number is larger than or equal to the first threshold, wherein the view request is a request to send the captured data captured by an onboard camera of the vehicle to a predetermined apparatus, the request number is a number that the view request is received from the user in a predetermined period, and the controller is configured to set the first threshold to a smaller value when the vehicle is a vehicle temporarily rented to the user as compared to when the vehicle is owned by the user; and send captured data captured by the onboard camera to the information processing apparatus.

17. The in-vehicle apparatus according to claim 16, wherein the controller is configured to:

acquire a startup number of a DC-DC converter in a predetermined period, the DC-DC converter being configured to transform electric power supplied to the target device; and send the startup number to the information processing apparatus.

* * * * *